US010234595B2

(12) United States Patent
Luvalle (10) Patent No.: US 10,234,595 B2
(45) Date of Patent: Mar. 19, 2019

(54) STATISTICAL PREDICTION FUNCTIONS FOR NATURAL CHAOTIC SYSTEMS AND COMPUTER MODELS THEREOF

(71) Applicant: OFS Fitel, LLC, Norcross, GA (US)

(72) Inventor: Michael J Luvalle, Morristown, NJ (US)

(73) Assignee: OFS FITEL, LLC, Norcross, GA (US)

( * ) Notice: Subject to any disclaimer, the term of this patent is extended or adjusted under 35 U.S.C. 154(b) by 382 days.

(21) Appl. No.: 14/791,011

(22) Filed: Jul. 2, 2015

(65) Prior Publication Data

US 2016/0003976 A1    Jan. 7, 2016

Related U.S. Application Data

(60) Provisional application No. 62/020,859, filed on Jul. 3, 2014.

(51) Int. Cl.
*G06F 15/18* (2006.01)
*G01W 1/10* (2006.01)
*G01W 1/14* (2006.01)

(52) U.S. Cl.
CPC ........... *G01W 1/10* (2013.01); *G01W 1/14* (2013.01)

(58) Field of Classification Search
None
See application file for complete search history.

(56) References Cited

U.S. PATENT DOCUMENTS

2004/0143396 A1* 7/2004 Allen ............... G01W 1/10
702/3

* cited by examiner

*Primary Examiner* — Robert G Bachner
(74) *Attorney, Agent, or Firm* — Michael P. Kochka, Esq.

(57) ABSTRACT

A method and apparatus for precipitation prediction is provided. In exemplary embodiments, the method may comprise, at a server having one or more processors and memory storing one or more programs for execution by the one or more processors: decomposing climate model attractors; receiving ground data in a region from a client as well as global data; reweighting and reordering the relative importance of the climate model attractors based on a rank and incorporating the ground data; reassembling a selected group of data including the ground data, thereby adding information to the climate model; and generating a prediction of regional weather based on the reassembled selected group of data.

18 Claims, 7 Drawing Sheets

STATISTICAL PREDICTION FUNCTIONS FOR NATURAL CHAOTIC SYSTEMS AND COMPUTER MODELS THEREOF

CROSS-REFERENCE TO RELATED APPLICATIONS

The present application claims priority to U.S. Provisional Patent Application Ser. No. 62/020,859 entitled "Attribution of regional seasonal changes in precipitation patterns to global climate change and other uses of statistical inference based on strange attractors," filed Jul. 3, 2014, the disclosure of which is incorporated herein by reference in its entirety as if fully set forth herein.

The present application is a continuation-in-part of U.S. patent application Ser. No. 13/823,285 entitled "Statistical Prediction Functions For Natural Chaotic Systems And Computer Models Thereof," filed Mar. 14, 2013, which is a national stage application of PCT application PCT/US2011/054748, filed Oct. 4, 2011, which claims priority to U.S. Provisional Patent Application Ser. No. 61/389,682, filed Oct. 4, 2010, and claims priority to U.S. Provisional Patent Application Ser. No. 61/542,677, filed Oct. 3, 2011, the disclosures of which are incorporated herein by reference in their entireties as if fully set forth herein.

BACKGROUND

Field of the Invention

Embodiments of the present invention are generally related to methods and apparatus for predicting weather. More specifically, embodiments of the present invention relate apparatus and methods of point prediction; extending the prediction lead time using predictive distributions; inversion of patterns in real world data to determine parameters of the dynamic model; and/or the like.

Description of Related Art

Predicting variations in weather conditions, climate conditions, or chaotic systems may have many practical applications. For example, predicting variations in precipitation at a local and regional level is important to a countless number of commercial, industrial and recreational activities, ranging from agriculture, to allocation of emergency service resources, to an ideal location for a little league baseball field. Prediction of regional interseasonal to interannual precipitation, however, has been described as one of the major challenges to climate science. Part of the challenge arises from the chaotic nature of the climate system, and part of it from the non-stationarity due to the rapid rise in global surface air temperature.

Weather prediction techniques have improved greatly in recent years. As weather predictions have become more accurate, businesses have incorporated weather-related analysis into their corporate planning decisions. Information concerning tornadoes, hurricanes, severe thunderstorms and the like have been used by utility companies, manufacturing plants, airlines, and other businesses to avoid losses. There are many limitations, however, to known methods of predicting precipitation and thus, a new method and apparatus is needed. Particular limitations that this method aims at, are poor skill even for low lead times (e.g. ½ month) for predicting seasonal precipitation (a climate prediction), and poor skill in daily (weather) precipitation predicting beyond 7 days. The methods described here build on methods described in a prior application WO2012/047874 A2, which is incorporated by reference as if fully set forth herein.

Neither purely empirical regression, nor General or Global Circulation Models (GCMs) are sufficiently accurate for interseasonal to interannual prediction of precipitation. A general circulation model (GCM), a type of climate model, is a mathematical model of the general circulation of a planetary atmosphere or ocean and based on the Navier-Stokes equations on a rotating sphere with thermodynamic terms for various energy sources (radiation, latent heat). General or Global Circulation Models (GCMs) are not accurate due to both uncertainty in initial conditions, and lack of sufficient detail on the integration of small scale physics. Statistical time series methods such as regressions can work temporarily, but do not reflect non-stationarity in the climate system, in particular the rapid rise in global surface air temperature (GSAT). Thus, there is a need for an improved method and apparatus for prediction of weather, climate, chaotic systems, or the like. For example, there is a need for an improved method and apparatus for prediction of regional interseasonal to interannual precipitation.

SUMMARY

Embodiments of the present disclosure generally relate to an apparatus, system, and method for predicting interseasonal precipitation. In one embodiment, a method for predicting interseasonal precipitation may comprise, at a server having one or more processors and memory storing one or more programs for execution by the one or more processors: decomposing climate model attractors (necessarily constructed under a steady state (e.g. constant global surface air temperature, GSAT) using delay maps as defined below; receiving both ground data in a region from a client, as well as data covering the same time period either from a global set of sensors decomposed into relevant empirical orthogonal functions or from a second source database compiling such a set of empirical orthogonal functions (e.g. Pacific Decadal Oscillation index). These local ground data and empirical orthogonal functions at various delays define the base variables in both the delay maps and the corresponding time series where appropriate. Reweighting and reordering the relative importance, by rescaling the time series fit as the climate model attractor components based on a rank incorporating the data, such as ground data; reassembling a selected group of data including the ground data, thereby adding information to the climate model; and generating a prediction of regional precipitation based on the reassembled selected group of data. The empirical orthogonal functions from global data are hereafter referred to as global data. A delay map of dimension J is any sequence of vectors of the form:

$$\left(x_{i_1 t_{i_1} 1}, x_{i_1 t_{i_1} 2}, \ldots, x_{i_j, t_{i_j} k}\right),$$

$$\left(x_{i_1 t_{i_1} 1 + \Delta}, x_{i_1 t_{i_1} 2 + \Delta}, \ldots, x_{i_j, t_{i_j} k + \Delta}\right) \ldots = z_t, z_{t+\Delta}, \ldots$$

where the $$x_{i_j t_{i_j}}$$

are measurable variables indexed by i, j, and a time in the dynamic system, under question and trackable variables in the models of said system.

In another embodiment of the present disclosure, a method for predicting interseasonal precipitation may comprise, at a server having one or more processors and memory storing one or more programs for execution by the one or more processors: decomposing Global Circulation Model (GCM) attractors; receiving data, for example ground data, comprising rainfall and temperature patterns in a region from a client plus the global data; reweighting and reordering the relative importance of the climate model attractor components based on a rank and incorporating the ground and global data; reassembling a selected group of data including the ground and global data, thereby adding information to the climate model; and generating a prediction of regional precipitation based on the reassembled selected group of data.

In yet another embodiment of the present disclosure, a system may comprise at least one server that may comprise one or more processors; and memory; wherein the at least one server is adapted to decompose climate model attractors; receive data, for example ground data, in a region from a client; reweight and reorder the relative importance of the climate model attractor components based on a rank and incorporating the ground data; reassemble a selected group of data including the ground data, thereby adding information to the climate model; and generate a prediction of regional precipitation based on the reassembled selected group of data.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention are generally related to methods and apparatus for predicting precipitation. More specifically, embodiments of the present invention relate apparatus and methods of point prediction; inversion using dates to inform the dynamic model; extending the prediction lead using predictive distributions; and/or the like. Precipitation is used as an example throughout the present disclosure, however it is contemplated by and within embodiments of the present disclosure that the systems and methods described herein may be used in chaotic systems, with shorter natural records (earthquakes, or the like), and/or with any climate functional (e.g., average temperature, average wind speed, and/or the like). As used herein, the term "precipitation" may be used to refer to any chaotic system and/or any climate functional. Precipitation is used merely as an example, embodiments disclosed herein may also be used in chaotic systems, with shorter natural records (earthquakes, or the like), and/or with any climate functional (e.g., average temperature, average wind speed, and/or the like for climate. For earthquakes similar records would include records from multiple seismographs or the tensor records for earthquakes as in the USGS tensor data base. For agricultural commodities markets one would include climate records as well as financial records e.g. for a number of related product, such as corn and wheat, and perhaps even changes in economic laws) Where computer models don't exist, historic records (giving one attractor model) may be used. In general, if the chaotic system is stationary, the method for prediction requires merely an historical record of data. If the system is not stationary, as for climate, some form of model is required to account for evolution of the underlying dynamics of the chaotic system, as captured by the attractors.

The climate system is generally chaotic. A defining characteristic of chaotic systems is extreme sensitivity to initial conditions, so that small differences in initial conditions result in trajectories that depart from one another at an exponential rate. As such, chaotic systems are generally impossible to predict in the long term. While long term prediction of a chaotic system is not possible, in accordance with embodiments of the present disclosure, embedology and fluctuation dissipation theory demonstrate that predictability over short times is possible.

In accordance with exemplary embodiments, for this short term predictability to be possible, the system has to be stationary, which requires that "tuning parameters", which control dynamics, are constant. Stationary chaotic systems can be characterized by their "strange attractor" or limiting set. What makes an attractor "strange" is that the trajectories of two points starting arbitrarily close depart from one another exponentially fast. A strange attractor, A, is often fractal, i.e. has fractional dimension.

In accordance with exemplary embodiments, evaluation of the climate system has led to the observation that many simple, low dimensional regressions are predictive, but any one such regression is only intermittently predictive, meaning that although the predictions may be successful for some time, they will have gaps of short time periods where prediction is unsuccessful.

The climate system works as if it is a high dimensional chaotic system. In exemplary embodiments, the mathematics that applies to high dimensional chaos may also apply to climate so the effects of small disturbances can be magnified. An important corollary is that the climate system, which may include water, air, and heat movement in the earth's atmosphere and oceans, is also influenced by a number of other chaotic systems, ranging from changes in the dynamics of the solar atmosphere and magnetic field, to changes in animal population and migration patterns (butterfly effects). Since we have not yet catalogued all the animals above, on, and under the earth and ocean, it is clear we have not yet construct a full model of this system including all influences on climate.

At the same time, in accordance with exemplary embodiments, the climate "attractor" describes the main long term tendencies of the changes and perturbations. One approach with an aim at incorporating the environmental information not necessarily available in any climate model, may be to decompose the "attractor" built by the climate model using embeddings, or the like.

In accordance with exemplary embodiments of the present disclosure, the embeddings are fit as multidimensional auto regressive linear time series. They are also serve as a fast approximation to simple neural net models, which have been shown to be dense in the set of attractors. This approach may be connected to fluctuation dissipation theorems.

In accordance with exemplary embodiments of the present disclosure, a method of creating predictive distributions for seasonal precipitation extending forward up to six seasons ahead has been studied for a number of geographical regions and prediction lags. Uncertainties in measurements may result in diffusion of the predictions across the attractor of the chaotic system as the prediction lag increases. Uncertainties may also increase due to the transfer of energy fluctuations from smaller scales to higher scales in a chaotic system (butterfly effect). This methods disclosed herein may provide some estimate of the possible butterfly effect.

In accordance with exemplary embodiments, the methods described herein may be implemented on an apparatus and may be inextricably tied to computer technology. Various apparatus may be used to collect measurements and may work together in a system for generating interseasonal precipitation predictions. Applications of the methods disclosed herein may include point prediction; inversion using date to inform the dynamic model; extending the prediction lead using predictive distributions; and/or the like. In one example, the method may include selecting base variables from the climate system as predictors of precipitation at time t0 at geographical position X. For n season ahead prediction, an apparatus or system in accordance with exemplary embodiments may randomly choose delays and variables from a base set to generate a delay map including precipitation at position X, n+delay time units after the time corresponding to the first term in the delay map In exemplary embodiments, each delay map may be modeled as a linear time series on a Global Circulation Model (GCM) run with steady state global average surface temperature for at least one century. The GCM version model may be sampled over several cells close to the target cell. In some embodiments, an evolutionary algorithm may be applied to sub-select, scale and combine the time series on prediction of real world data in sequential time periods leading to the time to be predicted. As used herein, whenever the word prediction is used, the data used in model building and selection may not be the data being predicted at that stage, rather only data from and earlier than the specified lead.

In exemplary embodiments, a first time period, which may be approximately 7 years long, may be used to rank the predictors. In some embodiments, the first time period may range from 2-10 years, or the like. In general, the first time period is preferably chosen to correspond to the time period over which the dynamics of the chaotic system changes appreciably. A key may be constructed on a second time period comparing combinations over different sets of the ordered predictors, choosing a statistical method to combine at each season and produce a correlation with an approximately 2 year period, or the like, using models originally built from a combination of a number of cells located close to the cell of the GCM corresponding to the real geographical location studied. In some embodiments, a final evolution stage may be completed by choosing those elements from a 3rd stage across different generated attractor models with values of the tuning parameters close to that of the time to be predicted with predictive correlations over some chosen positive value.

In exemplary embodiments of the present disclosure, in the point estimate method, the minimum correlation is chosen to be 0.5 or the like. The minimum correlation is preferably in the range 0.4 to 0.8. The $3^{rd}$ stage may be used in a final analysis to judge whether the final few predictions should be averaged at each point in time, or use medians, or the like. The $3^{rd}$ stage may also be used to combine across multiple attractor estimates produced by the GCM as well as to convert the correlations to calibrated predictions in the next stage by an "affine" transformation (i.e., by scaling by a positive number, adding an intercept). In accordance with exemplary embodiments, this may be justified for several reasons, the simplest being that the predictor variables are random. In some embodiments, the time periods may small because the climate is non stationary.

In accordance with exemplary embodiments of the present disclosure, to get the final distribution in the case of a predictive distribution a density is smoothed from the set of predictions with correlation over the minimum correlation from the many attractors examined (where the minimum correlation is varied above 0.4, or the like) and for each minimum correlation, with the density arrived by smoothing with the standard R density calculator, for example, using the default biased cross validation estimator to determine bandwidth, or the like. The density may be paired with a likelihood ratio of the density versus the seasonal historical density calculated from the historical data for the first time period mentioned above, calculated using 1 more season forward. If the likelihood ratio is greater than 1, then the likelihood ratio becomes proportional to a non zero weight for predictions further forward, or the like. In some embodiments, the remaining densities may be combined according to this weight.

Figure 1:
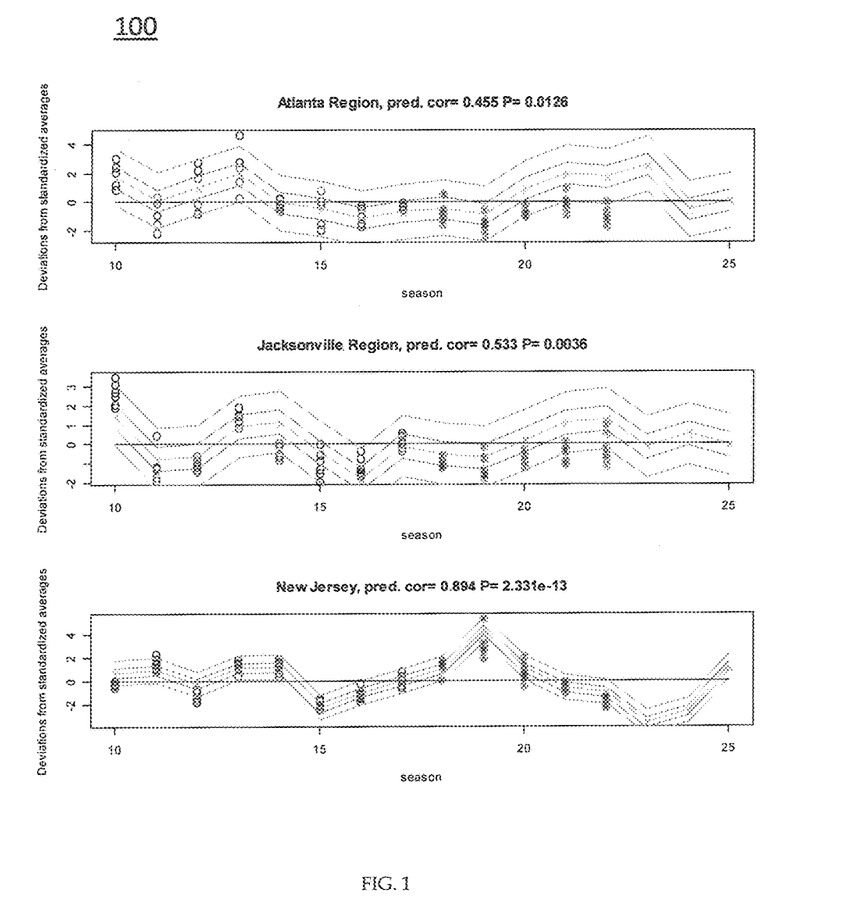
FIG. 1 depicts a graph illustrating an example of postdictions simulating running third season ahead predictions for three geographical regions in accordance with an exemplary embodiment of the present disclosure.

FIG. 1 depicts a graph illustrating an example of postdictions simulating running third season ahead predictions for three geographical regions in accordance with an exemplary embodiment of the present disclosure. Atlanta, Jacksonville, and New Jersey were selected as examples. In exemplary embodiments, one application of the apparatus and methods disclosed herein may be point prediction, or the like.

In FIG. 1, the circle points may represent weather station observations used in calibration, and the circles having an "x" there through (hereinafter "x time may represent points predicted, which may not be used in model fitting, selection or calibration, or the like. In some embodiments, the first "x time" may be fed into the model to predict a fourth "x time" period, and a first and second fed into predict a fifth time period.

The table below generally compares 3rd season ahead predictions in accordance with exemplary embodiments of the present disclosure against a 0.5 month ahead prediction from the National Oceanic and Atmospheric Administration's (NOAA's) Climate Prediction Center (CPC) using a Heidke skill score.

TABLE 1

| Region | 2011 Spring | 2011 Summer | 2011 Fall | 2011 Winter | 2012 Spring |
|---|---|---|---|---|---|
| NJ | 81/0 | 100/0 | 6.25/0 | 100/0 | 100/0 |
| Atl. Ga. | 100/100 | 100/0 | −50/0 | −25/100 | −50/25 |
| Jck. Fl. | 100/100 | 100/0 | 100/0 | −50/100 | −25/−50 |

The average skill over this time period for the chaos theory based method in accordance with embodiments of the present invention may be approximately 49.1667 compared with 25 for the CPC.

Figure 2:
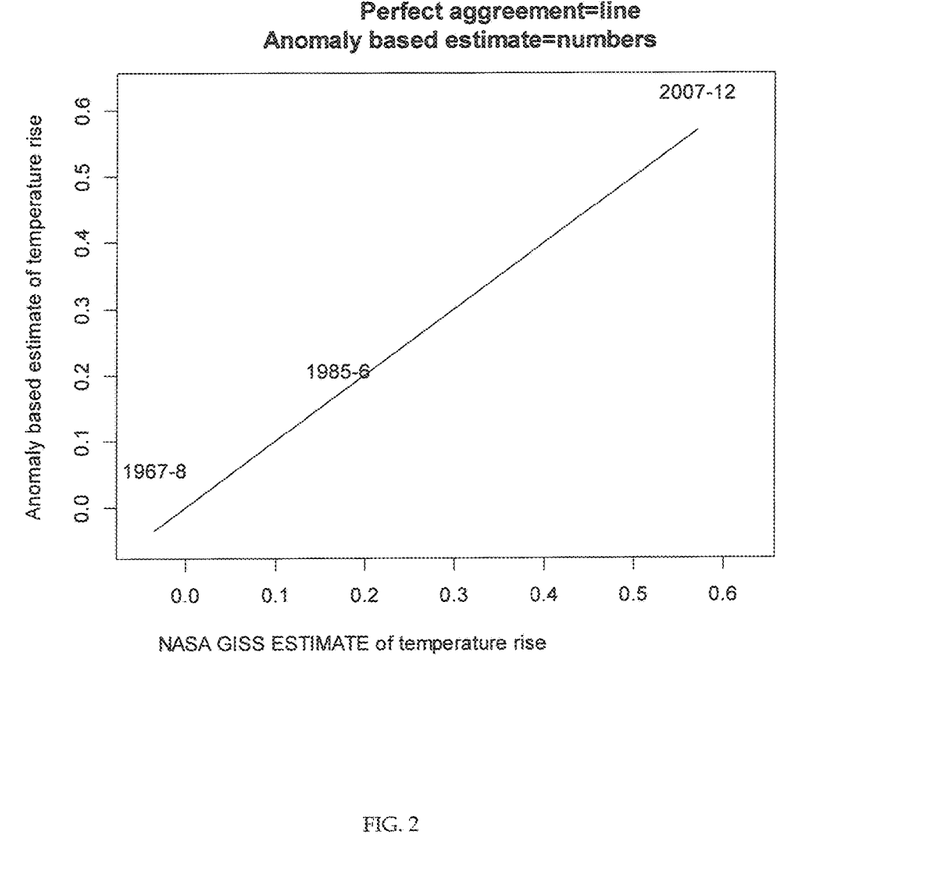
FIG. 2 depicts a graph illustrating an example relationship between anomaly based estimates of temperature rise and a National Aeronautics and Space Administration (NASA) Goddard Institute for Space Studies (GISS) estimate of temperature rise in accordance with an exemplary embodiment of the present disclosure.

FIG. 2 depicts a graph illustrating an example relationship between anomaly based estimate of temperature rise and National Aeronautics and Space Administration (NASA) Goddard institute for Space Studies (GISS) estimate of temperature rise in accordance with an exemplary embodiment of the present disclosure. An apparatus and/or method in accordance with exemplary embodiments of the present invention may be utilized for inversion and using data to inform the dynamic model. An application of embodiments of the present invention may be to use the real data to estimate parameterizations of the GCM.

One simple parameter with respect to a GCM run in steady state is the Global surface air temperature (GAST). Inferring global surface air temperature values from rainfall anomaly patterns if those anomaly patterns are organized in 15 year regions (so historical seasonal means are updated on 15 year intervals) demonstrates a very tight coupling in the region between rainfall anomaly patterns and GAST, which may be of use in attribution, or the like.

In accordance with exemplary embodiments of the present disclosure, applying similar methods to parameters set in parametrization models may allow the data such as ground data to inform and improve the GCM systems of equations. In some embodiments, rainfall patterns for a region, for example, northern California region, may be used. The method proceeded through stage 2 of the comparison to real data, then the P-value of the predictive correlations in the key for each attractor (based on fixed GAST for the GCM) is used to help estimate GAST. Using a false discovery rate of 0.01, the number of false discoveries per attractor (and hence GAST) may be calculated. The top 5 GAST with respect to this criterion were averaged together to produce the estimate for the vertical axis coordinate of the 3 points, for the particular time points below. The horizontal axis is the GISS estimate (2006 ref) of the GAST. The line represents perfect agreement, so this method shows slightly higher estimates than those given by GISS.

Figure 3:
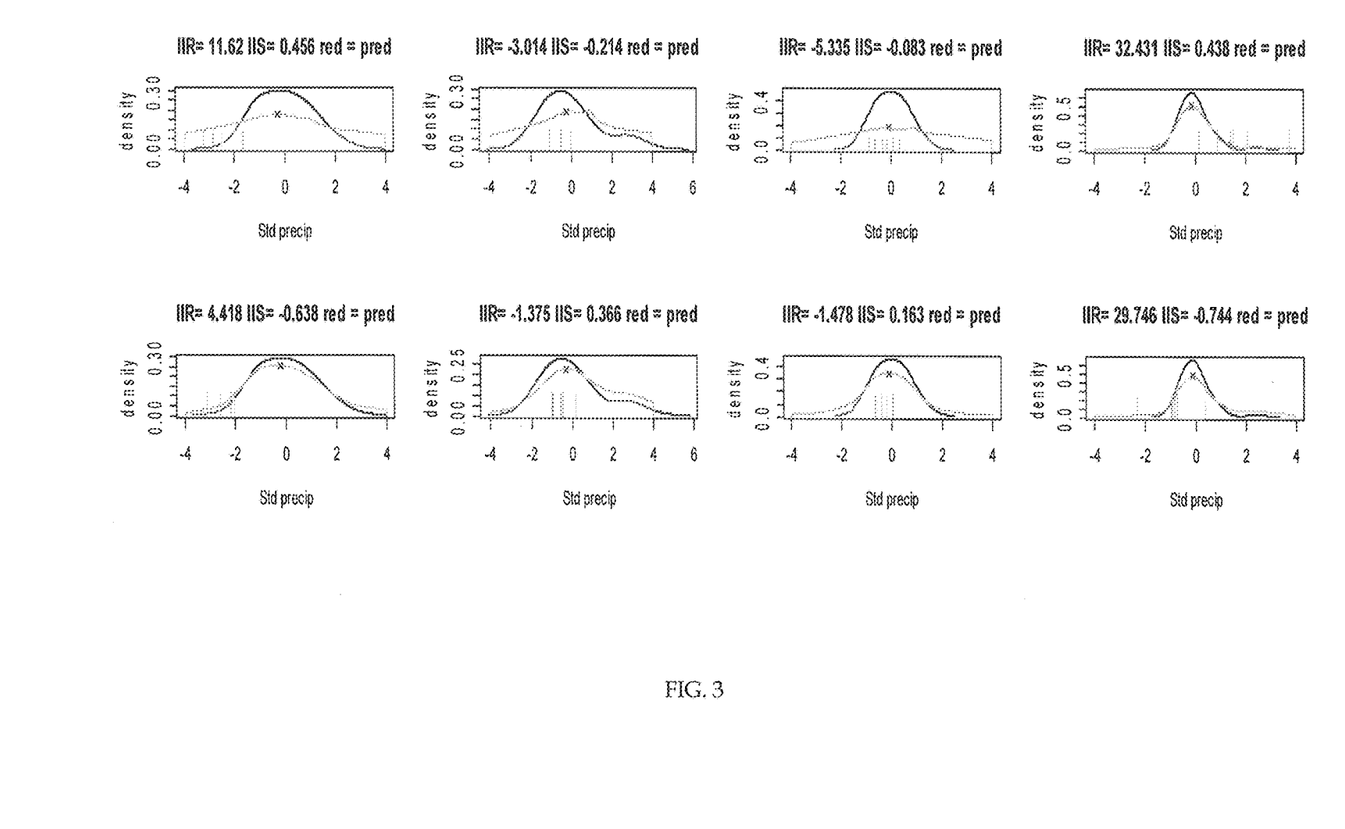
FIG. 3 depicts a graph illustrating predictive density and historic density in accordance with an exemplary embodiment of the present disclosure.
Figure 4:
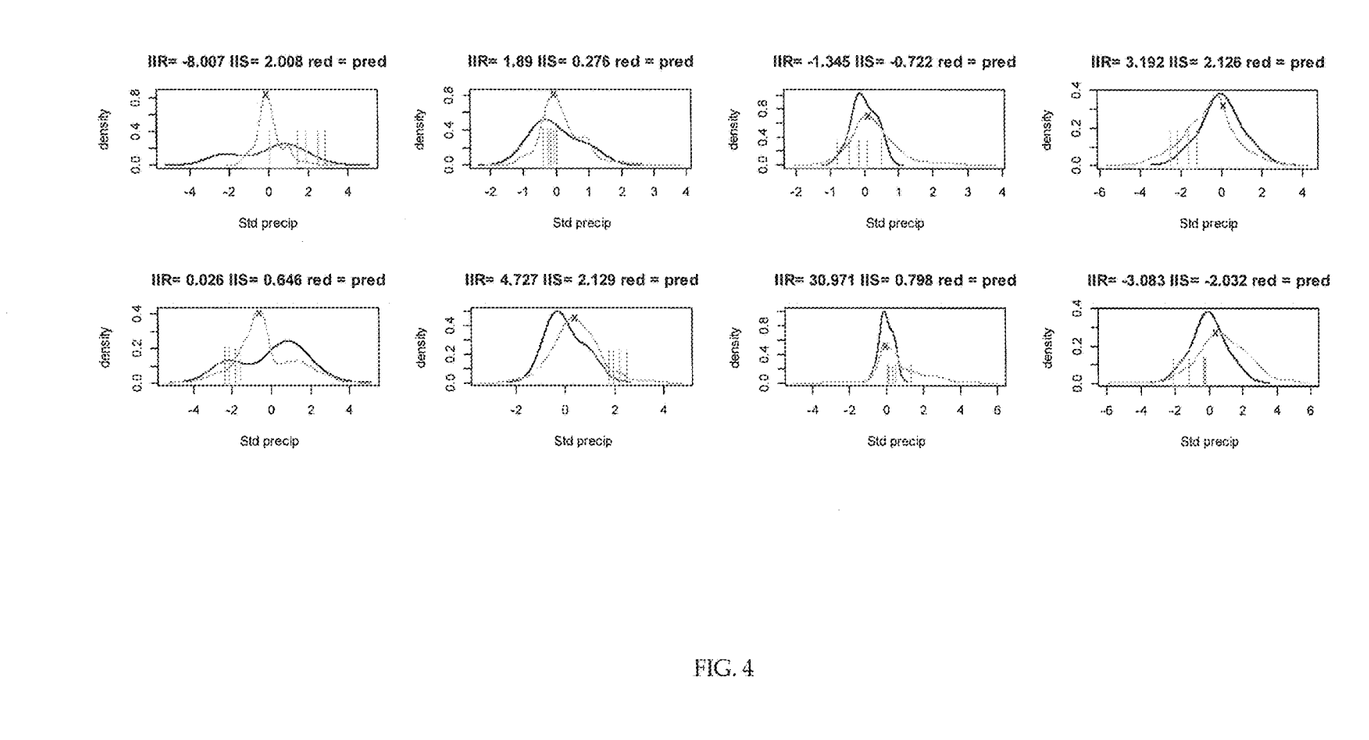
FIG. 4 depicts a graph illustrating predictive density and historic density in accordance with an exemplary embodiment of the present disclosure.

FIG. 3 and FIG. 4 depict graphs illustrating predictive density and historic density in accordance with an exemplary embodiment of the present disclosure. These figures show 5-season ahead rolling predictions for 8 seasons, with the first 4 seasons across the top row and the following 4 across the bottom row. FIG. 3 represents predictions for a region near Des Moines, Iowa, and FIG. 4 represents a region near Portland, Oreg. The final example of the use of this method was the result of trying to extend the lead time forward for predictions, by interpreting the distribution of predictions developed by this method, as what statisticians call a predictive distribution. The reason this allows extension of the method, is that there are two contributions to the departures any real strange attractor can make from the trajectory we can predict. The first is the limitation of the accuracy within which any given functionals of the climate can be measured, hence by the definition of the strange attractor our prediction may depart exponentially fast from reality. The second is that other systems are continually impacting the climate system.

Many of these impact the climate system in a small way, but that shift requires the climate to evolve from a different point than if the impact had not occurred. If the climate system also feeds back into this impacting system (e.g. plankton growth and movement with its impact on ocean mixing) then the total system is predictable. So decomposing the GCM attractor, then putting it back together incorporating even more information from the real world than is present in its equations and in its input initial conditions, may approximate the real world system.

For fifth season ahead predictions shown in FIGS. 3 and 4, one of the concerns was that chaos effect will cause the distribution to smear over the whole attractor. This may occur in some cases with some of the seasons for prediction in Iowa, for example, where the distribution appears smeared over the whole range uniformly. FIG. 3 shows this in the 1st and $3^{rd}$ seasons predicted. In these plots the predictive density has an x through the line, the historic density is in black. The likelihood of the observations based on the raw predictive density is compared to the likelihood of a symmetrized version. A positive value of lls (log likelihood symmetrized) means the likelihood favors the original predictive density, a negative value means the symmetrized density is favored over the original.

The predictive density may be reflecting a symmetric leakage of probability across the attractor, and the probability of a positive (or negative) value in each season may be binomial. As an example, for calculations of different combinations of season and geographical region, found 28 out of 45 data sets in which the original distribution was favored compared to the symmetrized distribution. This would happen by chance approximately 3.6 percent of the time (p~0.036). This demonstrates that the predictive density contains predictive information.

In exemplary embodiments, the likelihoods of the data given the historical distribution are compared with the predictive distributions. In section 1, the p-values are calculated as if the predicted values and predictions are statistically independent and deviations are normally distributed. A sequential probability ratio test where distributions for likelihood are calculated by kernel smoothing of observations on one hand, and of predictions developed as in the methods section on the other is used. In this case the departure from independent and identical distributions becomes obvious, because the swing between seasons for the sequential test are far too large.

In accordance with exemplary embodiments, bounds on the sequential test the p-values for rejection in either direction may be chosen as the corresponding nominal p value is approximately 1e-7. In particular, when the natural log of the likelihood ratio of the predictive likelihood over the historic likelihood is compared, adding the effect up over the season, when the sum is less than 47, there is evidence for the historic likelihood being a better predictor, when it exceeds 17 we assume there is evidence for the predictive likelihood being better. In FIG. 3 the log likelihood ratio exceeds 17 at the 4th season. In FIG. 4 this occurs at the 8th season for this sequence for Oregon.

The test may be calibrated under the null hypothesis that the predictive distribution is providing the same amount of information as the historic distribution, and the only reason for variation is a dumpiness in the data (the weather stations are in the same region so might be assumed to be correlated within each season). A statistical test of whether this dumpiness is responsible for the apparent increase in information provided by the predictive distribution give a p-value of 3e-3. In the 5 regions examined, all five showed "significance" in favor of the hypotheses that the predictive distribution is more informative than the historical distribution.

Embodiments of the present disclosure include a new technique for predicting regional precipitation several seasons ahead. The process of decomposing the climate model attractors, reweighting and reordering the importance of the attractor components based on a fit to the data in a region, and then reassembling the best pieces is adding information to that provided by the climate model. In FIG. 1 we see apparently accurate predictions (and data) nearly 4 standard deviations above normal in the second season being predicted. This was summer 2011, and approximately half of this water came from Hurricane Irene.

Figure 5:
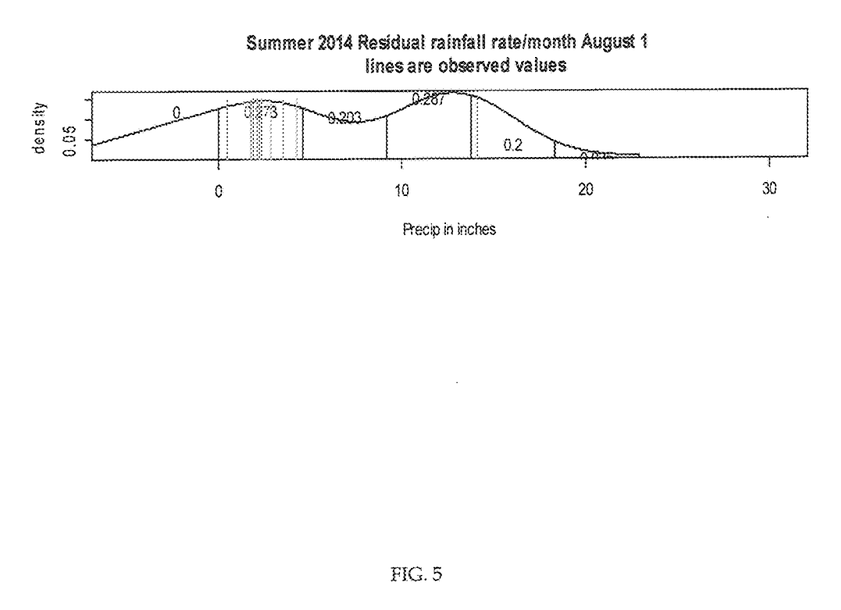
FIG. 5 depicts a graph illustrating predicted values and observed values of rainfall in accordance with an exemplary embodiment of the present disclosure.

FIG. 5 depicts a graph illustrating predicted values and observed values of rainfall in accordance with an exemplary embodiment of the present disclosure. When using the best least square fit to prior data to choose a family of predictors, a bimodal distribution is produced. Subtracting the precipitation that had occurred and for summer produced a bimodal density shown in FIG. 5. The data (plotted as vertical lines, at the end of a predetermined time period is reflected in FIG. 5. The extreme point at 15 inches was Islip on Long Island, where a storm passed through which dropped 14 inches of rain in less than 12 hours in August. As such, the systems and methods disclosed herein may be adapted to collect and predict information about extreme weather. In accordance with exemplary embodiments of the present disclosure, a random sampling of low dimension delay maps from a dynamic model with evolutionary tuning to real data may extend the prediction lead over dynamic models, wherein each region may be evaluated separately for potential lead.

Figure 6:
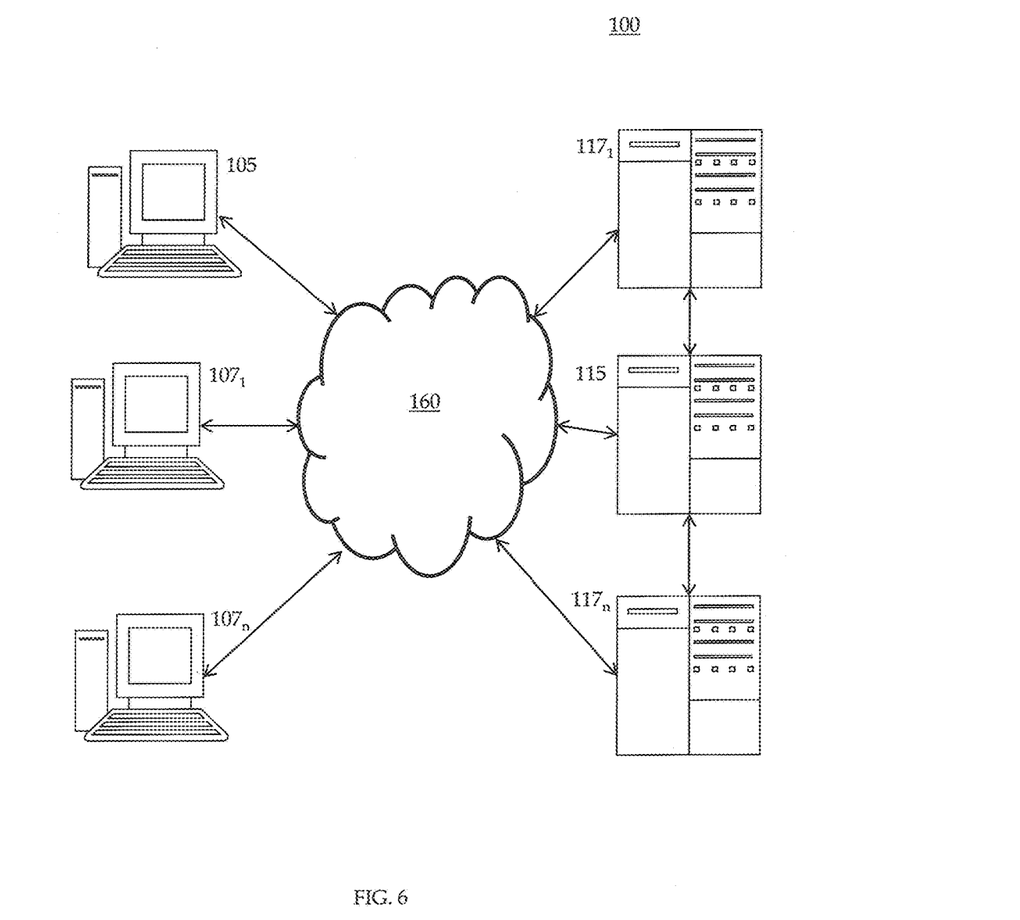
FIG. 6 depicts a system-level network diagram of a system for predicting interseasonal precipitation in accordance with embodiments of the present invention.

FIG. 6 depicts a system-level network diagram of a system for predicting interseasonal precipitation in accordance with embodiments of the present invention. In accordance with exemplary embodiments, a multicore system may be used to speed up calculations. A system in accordance with exemplary embodiments may use a set of automated weather stations. The system 100 generally comprises at least a first client 105 and secondary clients 107$_1$ and 107$_n$, each in communication with an administrator, generally hosting a central server 115, through a network 160. Methods in accordance with one or more embodiments of the present invention take place over the network 160, which may comprise a global computer network, for example, the Internet.

Although FIG. 6 explicitly depicts three secondary users (labeled 107$_1$, 107$_2$, and 107$_n$) it should be appreciated that n represents any number of users feasible in accordance with embodiments of the present invention. For ease of reference, as used herein, each of the terms "second user" or "secondary user" may refer to any one or all of the clients 107$_1$, . . . 107$_n$ within the system 100. Likewise, although FIG. 6 explicitly depicts only one first client 105, there may be more than one first client 105 in accordance with certain embodiments of the present invention. That is, in certain embodiments, multiple users may perform the same or similar functions as the first client 105. As understood by embodiments of the present invention, a user may include any person, business or entity, capable of participating in the system and methods disclosed herein.

The first client 105 may generally comprise an apparatus for collecting data related to weather, precipitation amounts, and/or data required by or related to the systems and methods of the present disclosure. The secondary clients 107 may generally comprise an entity or entities, or persons, collecting data in different geographical regions from the first client 105 as described above.

In a basic exemplary embodiment, within the system 100, the first client 105, and/or any of the secondary clients 107, may be capable of transmitting data to and from an administrator using a communication device. The communication device in the context of the present application may include, but is not limited to, a personal computer, a portable computer, a handheld computer, a cellular phone, a smart phone, a digital tablet, a laptop computer, an Internet appliance, an Apple iPhone, a Blackberry device, a Personal Data Assistant (FDA) or the like, or may generally include an appropriate data collection device.

The administrator generally comprises a server 115, which may further host an accessible data portal. In alternative embodiments, the server 115 may be located on a third party location (e.g., a server farm, or cloud), or at a location of the first client 105, or any one or more of the secondary clients 107. The accessible data portal, which may be accessible to the first client 105 and any of the secondary clients 107, communicates with each user through the network 160. The accessible data portal may comprise any number of security measures to provide a reasonably secure system, suitable for embodiments of the present invention. The accessible data portal may further comprise a graphical user interface (GUI) through which any of the first client 105 or secondary clients 107 may access the server 115.

Methods in accordance with embodiments of the present invention may take place over the network 160, which may comprise a global computer network, for example, the internet. The communications functions described herein can be accomplished using any kind of wired and/or wireless computing network or communications means capable of transmitting data or signals, such as a wireless and/or wired computing network allowing communication via, for example, an 802.11 ("Wi-Fi") protocol, cellular data protocol (e.g., EDGE, CDMA, TDMA, GSM, LTE), and/or the like. Suitable examples include a packet-switched network, a local area network (LAN), wide area network (WAN), virtual private network (VPN), or any other means of transferring data. The network 160 may be a partial or full deployment of most any communication/computer network or link, including any of, any multiple of, any combination of or any combination of multiples of a public or private, terrestrial wireless or satellite, and wireline networks or links. A single network 160 or multiple networks (not shown) that are communicatively coupled to one another can be used. It is contemplated that multiple networks of varying types can be connected together and utilized to facilitate the communications contemplated by the systems and elements described in this disclosure.

Although FIG. 6 depicts two secondary clients $107_1$ and $107_n$, it should be appreciated that "n" represents any number of clients feasible in accordance with embodiments of the present disclosure. For ease of reference, as used herein, the term "client" may refer to any one or all of the clients, 105, $107_1$, and $107_n$ within the system 100. That is, in certain embodiments, multiple clients may perform the same or similar functions. For ease, one client 105 will be referred to herein, however in exemplary embodiments, more than one client 105 may be included in the system 100.

As used herein, the term "computer" may generally refer to any device that is capable of processing a signal or other information. Examples of computers include, without limitation, a personal computer, a portable computer, a handheld computer, a cellular phone, a smart phone, a digital tablet, a laptop computer, a netbook, an Internet appliance, a Personal Data Assistant (PDA), an application-specific integrated circuit (ASIC), a programmable logic array (PLA), a microcontroller, a digital logic controller, a digital signal processor (DSP), or the like, or may generally include a data collection apparatus configured for use in accordance with the methods and systems of the present disclosure. A computer may include software in the form of programmable code, micro code, and or firmware or other hardware embedded logic and may include multiple processors which operate in parallel. The processing performed by a computer may be distributed among multiple separate devices, and the term computer encompasses all such devices when configured to perform in accordance with the disclosed embodiments.

The client 105 may generally comprise a communications device, such as a computer. In a basic exemplary embodiment, within the system 100, the client 105 may be capable of transmitting data to and from a host server 115. The host server 115 may host an accessible data portal (e.g., a website or the like). The accessible data portal, which may be accessible to the client 105, may communicate with the client 105 through the network 160. The accessible data portal may comprise any number of security measures to provide a reasonably secure system, suitable for embodiments of the present disclosure. The accessible data portal may further comprise a graphical client interface (GUI) through which a client 105 may access the server 115.

The system may also comprise secondary servers $117_1$ and $117_n$. Although two secondary servers $117_1$ and $117_n$ are depicted in FIG. 1, it should be appreciated that "n" represents any number of servers feasible in accordance with embodiments of the present disclosure. For ease of reference, as used herein, the term "server" may refer to any one or all of the servers, 115, $117_1$, and $117_n$ within the system 100. That is, in certain embodiments, multiple servers may perform the same or similar functions.

The server 115 may also comprise a database or other sortable data storage memory to enable the system and methods disclosed herein. In many embodiments, the database may be any commercially available data storage database suitable for embodiments of the present disclosure. For example, in one embodiment, the database comprises at least one or more database management systems, such as any of an Oracle, DB2, Microsoft Access, Microsoft SQL Server, Postgres, MySQL, 4th Dimension, FileMaker, Alpha Five Database Management System, or the like. Often contained within the database is a plurality of data sets, each comprising specific data. A first data set may correlate to a first client 105, wherein a plurality of client-specific data is stored. The database may also include any number of subsequent data sets representing N clients, wherein N represents any number of clients practical for operation of embodiments of the present disclosure. In accordance with one embodiment of the present disclosure, any of the servers or clients may comprise a computer or data collection device configured for use with embodiments of the present disclosure.

Figure 7:
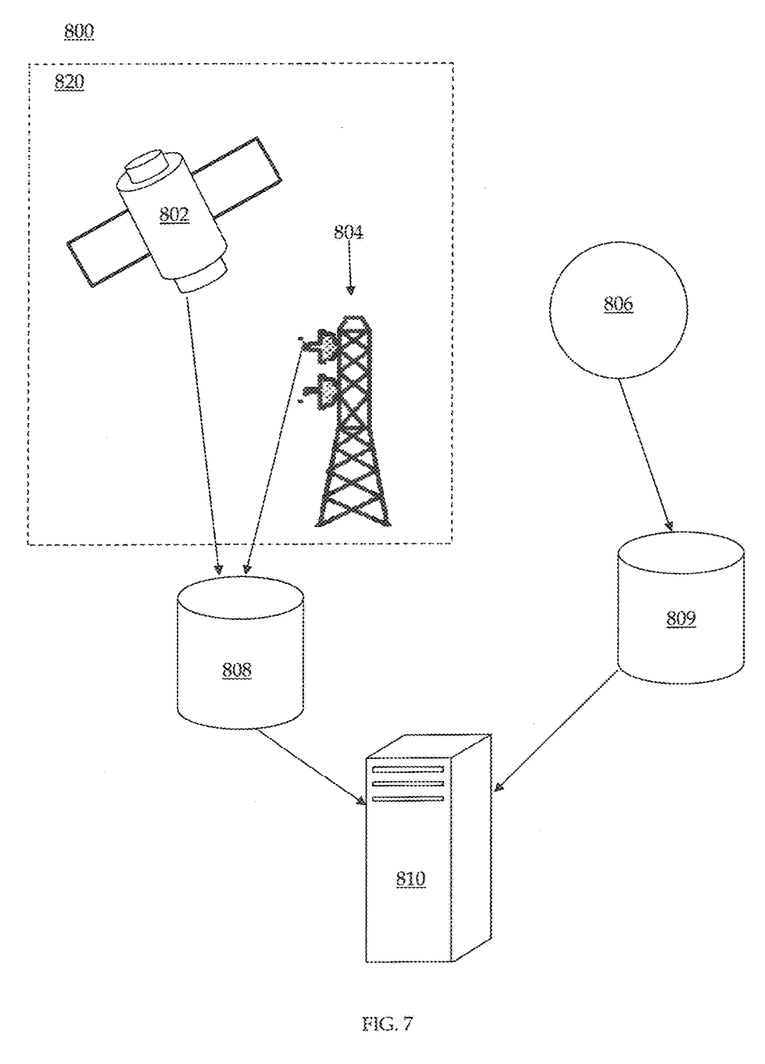
FIG. 7 depicts a system-level diagram of a system for predicting interseasonal precipitation in accordance with embodiments of the present invention.

FIG. 7 depicts a system-level diagram of a system 800 for predicting interseasonal precipitation in accordance with embodiments of the present invention. In accordance with exemplary embodiments, the system 800 may comprise real world observations 820, a Global Circulation Model (GCM) 806, databases 808, 809, and one or more servers 810, or the like. A system 800 may comprise networked sensor hardware, or the like. A system may include one or more weather stations 804 communicatively coupled with a database 808 and/or a server 810, and/or the like. For example, a system 800 may comprise 10-12 weather stations, or the like. A weather station may generally comprise an observation post where weather conditions and meteorological data are observed and recorded.

In some embodiments, a system 800 may comprise one or more weather, precipitation, and/or temperature sensing satellites 802 communicatively coupled with a database 808 and/or a server 810, and/or the like. For example, a system 800 may comprise 1-12 precipitation and/or temperature sensing satellites. In some embodiments, the system 800 may comprise one or more of ocean floats, ship going sensors, weather balloons, aircraft, or the like, to sense global raw data for empirical orthogonal functions such as El Niño/Southern Oscillation (ENSO), Pacific Decadal Oscillation (PDO), Arctic Oscillation (AO), North Atlantic Oscillation (NAO), Atlantic Multi-decadal Oscillation (AMDO), or the like.

In some embodiments, the system 800 may comprise computing hardware. For example, the system 800 may comprise a global circulation models (GCM) 806, global climate models, or the like, which may be run, for example, with constant greenhouse gas to steady state in mean for approximately 100 years for several different steady states, or the like. In accordance with exemplary embodiments, a system 800 may be adapted for fitting each of the 100 year steady state systems to many small linear models, or the like. In some embodiments, one system for comparing ranking may be adapted to select small linear models from those built on the steady state systems to short runs of real data leading up to time to be predicted. In some embodiments, In exemplary embodiments of the present disclosure, the system 800 may comprise networked sensor hardware and store the data in a central system for subsequent retrieval. In some embodiments of the present disclosure, the networked sensor hardware may comprise a worldwide network of sensors, or the like. In some embodiments of the present disclosure, the system 800 may run climate models and complete statistical fitting, or the like. In some embodiments, the system 800 may be adapted to retrieve data from the databases 808, 809 and the server 810 may be adapted to extract attractor statistics, revaluate attractor statistics given a real world past, and predict real world given reevaluated attractor statistics and real world past, or the like.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein. In addition, embodiments of the present invention are further scalable to allow for additional components, as particular applications may require.

What is claimed is:

1. A method for predicting regional precipitation, the method comprising:
   at a server having one or more processors and memory storing one or more programs for execution by the one or more processors:
   decomposing, using delay maps, climate model attractors receiving data in a region from a client, the attractors produced from a Global Circulation Model (GCM) run with a steady state global surface air temperature, thereby determining global data;
   reweighting and reordering the relative importance of the climate model attractors components based on a rank and incorporating ground data;
   reassembling a selected group of components including the ground and global data, thereby adding information to the climate model attractors; and
   generating a prediction of regional precipitation based on the reassembled selected group of components.

2. The method of claim 1, further comprising, for n season ahead prediction, choosing delay maps to generate a time series corresponding to position X n+delay time units ahead.

3. The method of claim 2, further comprising applying an evolutionary algorithm to sub-select, scale and
   combine the time series predicting regional precipitation in sequential time periods leading to the time to be predicted.

4. The method of claim 2, wherein a first time period is used to rank the predictive ability of each delay map, wherein the first time period comprises 4-10 years.

5. The method of claim 4, further comprising constructing a key on a second time period comparing combinations of time series over sets of ordered data.

6. The method of claim 5, further comprising utilizing a statistical method to combine time series at each season and produce a correlation with a time period using models built from a combination of a number of cells located close to the cell of the GCM corresponding to a real location studied.

7. The method of claim 6, further comprising choosing those elements from the 3rd stage with predictive correlations with minimum correlation greater than 0.4.

8. The method of claim 1, wherein the data comprises rainfall patterns for a region.

9. The method of claim 1, further comprising selecting base variables to define delay maps for decomposition of attractors.

10. A method for predicting regional precipitation, the method comprising:
    at a server having one or more processors and memory storing one or more programs for execution by the one or more processors:
    decomposing, using delay maps, climate model attractors receiving data in a region from a client, the attractors produced from a Global Circulation Model (GCM) run with a steady state global surface air temperature thereby determining global data;
    receiving data comprising rainfall patterns in a region from a client;
    reweighting and reordering the relative importance of the climate model attractors components based on a rank and incorporating ground data;
    reassembling a selected group of components including the ground data and global data, thereby adding information to the attractors; and
    generating a prediction of regional precipitation based on the reassembled components.

11. The method of claim 10, further comprising selecting base variables from the climate system as predictors of precipitation at time t0 at position X.

12. The method of claim 11, further comprising, for n season ahead prediction, choosing delays and variables from a base set to generate a delay map at position X n+delay time units ahead.

13. The method of claim 12, further comprising applying an evolutionary algorithm to sub-select, scale; and
    combining the time series on prediction of real world data in sequential time periods leading to the time to be predicted.

14. The method of claim 13, wherein a first time period is used to rank the data, wherein the first time period comprises 4-10 years.

15. The method of claim 14, further comprising constructing a key on a second time period comparing combinations over sets of ordered data.

16. The method of claim 15, further comprising utilizing a statistical method to combine at each season and produce a correlation with a time period using models built from a combination of a number of grids located close to the grid of the GCM corresponding to a real location studied.

17. A system comprising at least one server, the server comprising:
    one or more processors; and
    memory;
    wherein the at least one server is adapted to:
    decompose, using delay maps, climate model attractors, wherein the climate model is a Global Circulation Model (GCM) run with a steady state global average surface for at least one century, thereby determining global data;
    receive data in a region from a client;
    reweight and reorder the relative importance of the climate model attractor components based on a rank and incorporating ground data;
    reassemble a selected group of data including the ground and global data, thereby adding information to the climate attractors; and
    generate a prediction of regional precipitation based on the reassembled components.

18. The system of claim 17, wherein the data comprises rainfall patterns for a region.

* * * * *